(12) United States Patent
Maesoba et al.

(10) Patent No.: US 9,116,307 B2
(45) Date of Patent: Aug. 25, 2015

(54) SLEEVE FOR OPTICAL CONNECTOR, AND OPTICAL CONNECTOR

(75) Inventors: Hiroyoshi Maesoba, Yokkaichi (JP); Tetsuji Tanaka, Yokkaichi (JP); Hidetoshi Ishida, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 255 days.

(21) Appl. No.: 13/824,164

(22) PCT Filed: Oct. 3, 2011

(86) PCT No.: PCT/JP2011/072741
§ 371 (c)(1),
(2), (4) Date: Mar. 15, 2013

(87) PCT Pub. No.: WO2012/046680
PCT Pub. Date: Apr. 12, 2012

(65) Prior Publication Data
US 2013/0183002 A1     Jul. 18, 2013

(30) Foreign Application Priority Data
Oct. 8, 2010   (JP) ................................. 2010-228059

(51) Int. Cl.
*G02B 6/38* (2006.01)
(52) U.S. Cl.
CPC ................ *G02B 6/38* (2013.01); *G02B 6/3869* (2013.01); *G02B 6/3877* (2013.01); *G02B 6/387* (2013.01); *G02B 6/3878* (2013.01)
(58) Field of Classification Search
None
See application file for complete search history.

(56) References Cited

U.S. PATENT DOCUMENTS

| 4,690,494 | A | * | 9/1987 | Hirose et al. ..................... 385/60 |
| 5,129,032 | A | * | 7/1992 | Kawai et al. ..................... 385/76 |
| 5,195,155 | A | * | 3/1993 | Shimaoka et al. ............. 385/90 |
| 5,841,924 | A | * | 11/1998 | Mugiya et al. .................. 385/93 |
| 2002/0097964 | A1 | * | 7/2002 | Roehrs et al. ................... 385/59 |
| 2008/0170827 | A1 | * | 7/2008 | Mitamura ....................... 385/78 |

(Continued)

FOREIGN PATENT DOCUMENTS

| JP | U-58-103011 | 7/1983 |
| JP | U-62-188713 | 12/1987 |

(Continued)

OTHER PUBLICATIONS

Japanese Office Action issued issued in Japanese Patent Application No. 2012-537694 dated Jun. 18, 2013 (with translation).

(Continued)

*Primary Examiner* — Mike Stahl
(74) *Attorney, Agent, or Firm* — Oliff PLC

(57) ABSTRACT

A sleeve for an optical connector into which a ferrule arranged to hold an optical fiber is to be inserted, and by which an optical connector in which the sleeve is to be housed can be reduced in size in a direction that the optical connector is fitted into a counterpart optical connector. A sleeve for an optical connector includes a portion having a tube shape, into which a ferrule is to be inserted, and a hook portion at one end of the sleeve, the hook portion protruding in a diameter direction of the tube-shaped portion.

4 Claims, 7 Drawing Sheets

(56) References Cited

U.S. PATENT DOCUMENTS

2011/0206324 A1* 8/2011 Childers et al. ............... 385/55
2014/0205241 A1* 7/2014 Nielson ......................... 385/66

FOREIGN PATENT DOCUMENTS

| JP | A-2003-295001 | 10/2003 | | |
|---|---|---|---|---|
| JP | A-2005-156969 | 6/2005 | | |
| JP | A-2006-208631 | 8/2006 | | |
| JP | 2006-308907 A | * | 11/2006 | ............... G02B 6/38 |

OTHER PUBLICATIONS

Nov. 1, 2011 International Search Report issued in International Patent Application No. PCT/JP2011/072741.

* cited by examiner

SLEEVE FOR OPTICAL CONNECTOR, AND OPTICAL CONNECTOR

TECHNICAL FIELD

The present invention relates to a sleeve for an optical connector, into which a ferrule to which an optical fiber is fixed is to be inserted, and an optical connector including the sleeve housed in its connector housing.

BACKGROUND ART

Generally allowing high-speed telecommunications of a large amount of information, optical cables including optical fibers (referred to also as fiber-optic cables) are in widespread use for home telecommunications and industrial telecommunications. For example, the optical cables are frequently used for optical communications in a variety of electrical components (e.g., a car navigation system) installed in automobiles. With this improving optical communications, a variety of optical connectors (referred to also as fiber-optic connectors) arranged to optically connect ends of optical fibers (to connect ends of optical fibers so as to transmit optical signals) have been proposed.

A ferrule arranged to hold the end of the optical fiber is disposed in each optical connector. The optical fiber is fixed to the ferrule such that the end of the optical fiber is on a level with the top end of the ferrule, whereby the top end of the ferrule and the top end of a ferrule of a counterpart optical connector are butted against each other. Thus, the ends of the optical fibers are optically connected.

In this type of optical connector, a tube-shaped member referred to as a split sleeve is used in order to prevent axis deviation of the butted ferrules (optical fibers) as disclosed in PTLs 1 to 3, for example. The split sleeve is generally housed inside of a housing (a split-sleeve accommodating portion) of one optical connector, where the ferrule of the one optical connector is inserted into the split sleeve. When the one optical connector is fitted into the other optical connector, the ferrule of the other optical connector gets into the split sleeve to be butted against the ferrule of the one optical connector. Including a slit along its axial direction, the split sleeve holds the ferrules of the one optical connector and the other optical connector, which are inserted into the split sleeve, so as to tighten them inward by its elastic force. That is, the ferrules of the one optical connector and the other optical connector are held by the split sleeve without rattling in the split sleeve, which can prevent axis deviation of the butted ferrules.

CITATION LIST

Patent Literature

PTL 1: JP 2006-208631 A
PTL 2: JP 2005-156969 A
PTL 3: JP 2003-295001 A

SUMMARY OF INVENTION

Technical Problem

The split sleeve is housed in the connector housing while limited in its movement in the axial direction. The split sleeve is generally limited in its movement by using the shape of the split-sleeve accommodating portion (connector housing) as disclosed in PTLs 1 to 3. To be specific, as shown in FIG. 7, a split-sleeve accommodating portion 102 includes a front stopping portion 102a on its top end side, which has an inner diameter smaller than the outer diameter of a split sleeve 100 into which a ferrule 104 is inserted, whereby the split sleeve 100 is limited in its movement toward the front.

The front stopping portion has a given thickness in a direction that the optical connector is fitted into the counterpart optical connector. In other words, the optical connector increases in size in the fitted direction by the thickness of the front stopping portion (the thickness indicated with "D" in FIG. 7). However, because there are efforts underway to narrow wiring spaces especially in automobiles in these years, optical connectors have been desired to be reduced in size. Thus, the reduction in size of the optical connector even by the thickness of the front stopping portion provided to the connector housing is very significant.

The present invention has been made in view of the above circumstances and has an object to overcome the above problem, and to provide a sleeve for an optical connector into which a ferrule arranged to hold an optical fiber is to be inserted, and by which an optical connector in which the sleeve is to be housed can be reduced in size in a direction that the optical connector is fitted into a counterpart optical connector. In addition, the present invention has an object to provide an optical connector that includes the sleeve into which the ferrule is to be inserted, and a connector housing in which the sleeve is housed, and can be reduced in size in a direction that the optical connector is fitted into a counterpart optical connector.

Solution to Problem

To achieve the objects and in accordance with the purpose of the present invention, a sleeve for an optical connector of the present invention includes a portion having a tube shape into which a ferrule is to be inserted, and a hook portion at one end of the sleeve, the hook portion protruding in a diameter direction of the tube-shaped portion.

It is preferable that the sleeve further includes a straight portion that extends from one end of the tube-shaped portion in an axial direction of the tube-shaped portion, wherein the hook portion has the shape of bending in the diameter direction from a top end of the straight portion.

Further, it is preferable that the sleeve includes two or more hook portions that are disposed at regular intervals.

In another aspect of the present invention, an optical connector includes the sleeve for optical connector described above, and a connector housing, in which the sleeve for optical connector is housed, and which includes a sleeve accommodating portion, wherein the tube-shaped portion of the sleeve is housed in the sleeve accommodating portion, and wherein the hook portion is hooked on a rim of an opening of the sleeve accommodating portion, the opening being on a posterior end side of the sleeve accommodating portion.

It is to be noted that in the present invention the "tube shape" of the sleeve is not necessarily limited to the shape that is substantially round in cross section, and includes any shapes such as a substantial rectangle and triangle that surround the periphery of the ferrule that is to be inserted into the sleeve.

Advantageous Effects of Invention

Including the hook portion protruding in the diameter direction of the tube-shaped portion into which the ferrule is to be inserted, the sleeve of the present invention can be limited in its movement toward the front only by being housed in the connector housing while the hook portion is hooked on the connector housing. Thus, it is unnecessary to provide the connector housing with a front stopping portion arranged to stop the sleeve, which can accordingly reduce the size of the entire optical connector in which the sleeve is to be housed.

If the sleeve further includes the straight portion that extends from the one end of the tube-shaped portion in the axial direction of the tube-shaped portion, and the hook portion has the shape of bending in the diameter direction from the top end of the straight portion, the tube-shaped portion can be prevented from decreasing in degree of tube shape by including the hook portion. To be specific, the configuration of including the straight portion that extends straight from the one end of the tube-shaped portion can prevent the tube-shaped portion from being deformed significantly while the straight portion could be deformed slightly by being pulled by the hook portion when the hook portion is bent in the diameter direction. If the tube-shaped portion into which the ferrule is to be inserted decreases in degree of tube shape, axis deviation of ferrules (optical fibers) could increase; however, the configuration described above can prevent the tube-shaped portion from being deformed by including the hook portion, and can thus prevent axis deviation of the ferrules (optical fibers).

In addition, if the sleeve includes the two or more hook portions that are disposed at regular intervals, the sleeve can be prevented from being inclined in the connector housing, that is, the sleeve can be housed steady in the connector housing.

Meanwhile, because the optical connector of the present invention has the configuration that the hook portion of the sleeve is hooked on the rim of the opening of the sleeve accommodating portion, the opening being on the posterior end side of the sleeve accommodating portion, the sleeve can be limited in its movement toward the front. Thus, it is unnecessary to provide the connector housing with a front stopping portion arranged to stop the sleeve, which can accordingly reduce the size of the entire optical connector.

DESCRIPTION OF EMBODIMENTS

Figure 4:
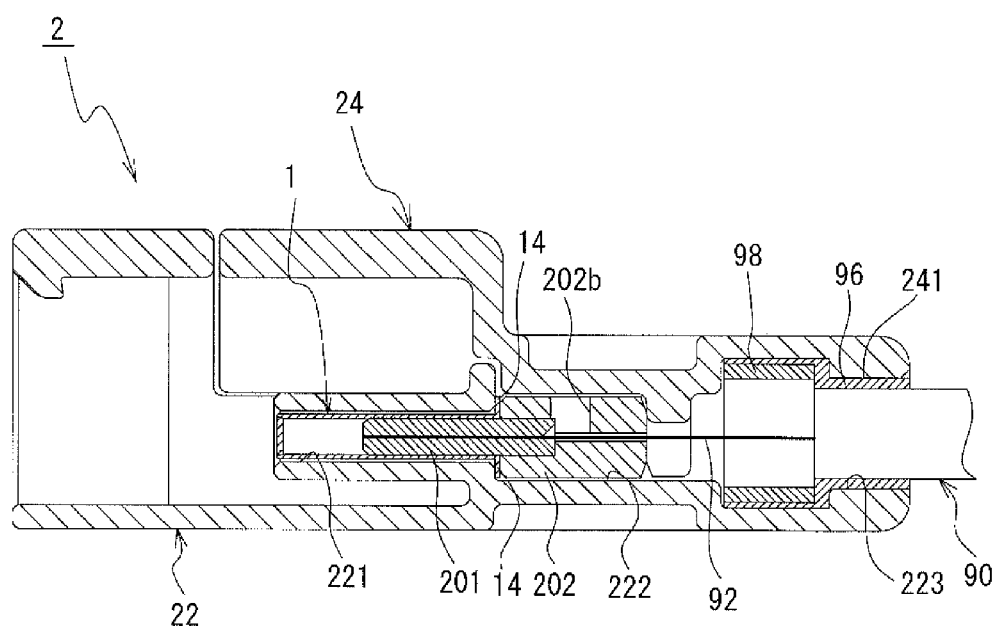
FIG. 4 is a cross-sectional view (a vertical cross-sectional view) showing the optical connector of the preferred embodiment of the present invention (also showing the optical cable and the cable fixing member).
Figure 5:
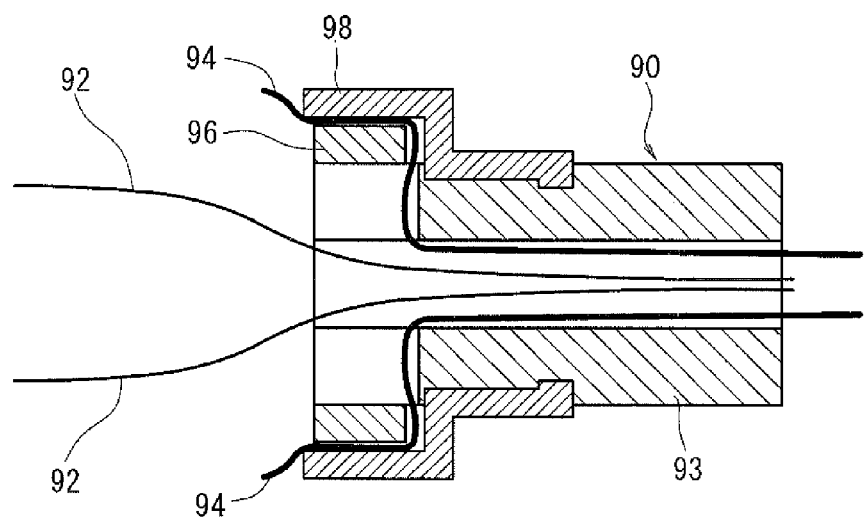
FIG. 5 is a cross-sectional view schematically showing the optical cable, and the cable fixing member that is fixed to the optical cable.

Detailed descriptions of preferred embodiments of the present invention will now be provided with reference to the accompanying drawings. It is to be noted that hereinafter a top end (front) side refers to as the side where a connector is fitted into a counterpart optical connector, and a posterior end (posterior) side refers to as the side where the connector is connected with an optical cable 90, unless otherwise noted. In addition, an axial direction refers to as the axial direction of a split sleeve 1, and a vertical direction refers to as the vertical direction in FIG. 4.

First, a description of a sleeve for an optical connector (split sleeve 1) of a preferred embodiment will be provided. The split sleeve 1 includes a portion 10 having a tube shape, a straight portion 12 disposed at one end of the tube-shaped portion 10, and a hook portion 14 disposed at the top end of the straight portion 12. The split sleeve 1 is preferably made from elastic metal, which is not limited specifically.

The tube-shaped portion 10 defines a portion into which a ferrule to which an optical fiber 92 is fixed is to be inserted. The tube-shaped portion 10 includes a slit 101 of a given width along its longitudinal (axial) direction, and accordingly has the shape of the letter "C" in cross section. The inner diameter of the tube-shaped portion 10 in a normal state (a state where nothing is inserted into the tube-shaped portion 10) is slightly smaller than the outer diameter of the ferrule to be inserted into the tube-shaped portion 10. To be specific, the tube-shaped portion 10 has a size so as to be expanded outward by the ferrule inserted thereinto. Thus, when the ferrule is inserted into the tube-shaped portion 10, the tube-shaped portion 10 holds the ferrule so as to tighten it inward by its elastic force restoring original shape.

The straight portion 12 defines a portion that extends straight from the one end of the tube-shaped portion 10 in the axial direction of the tube-shaped portion 10. The straight portion 12 is same in width as the hook portion 14.

Figure 1:
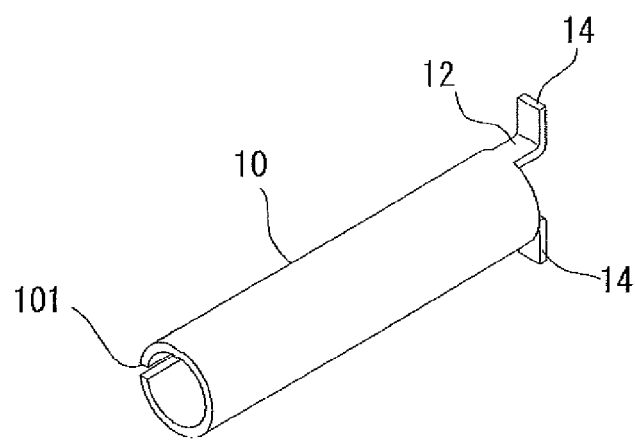
FIG. 1 is an external perspective view showing a configuration (a configuration of including two hook portions) of a sleeve for an optical connector of a preferred embodiment of the present invention.
Figure 6:
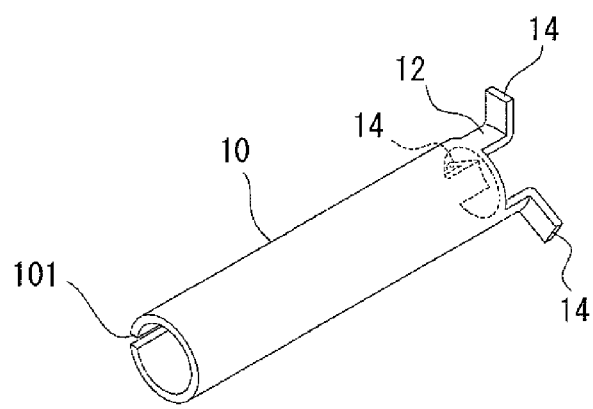
FIG. 6 is a view showing a configuration (a configuration of including three hook portions) of a modification of the sleeve shown in FIG. 1.
Figure 7:
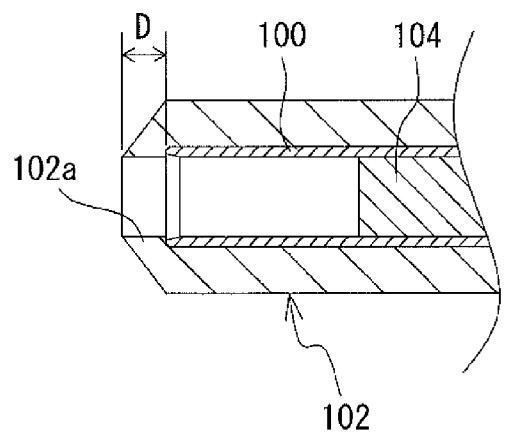
FIG. 7 is a view for illustrating the shape of a front stopping portion provided to a conventional optical connector.

The hook portion 14 defines a portion having the shape of bending at a right angle outward in the diameter direction of the tube-shaped portion 10 from the top end of the straight portion 12. In the present embodiment, two hook portions 14 are provided to the split sleeve 1 at regular intervals (at 180-degree intervals) along a circumferential direction of the split sleeve 1 as shown in FIG. 1. The number of hook portions 14 is not limited specifically (e.g., it is preferable to provide three or more hook portions 14 like a split sleeve 1' shown in FIG. 6) as long as the hook portions 14 are disposed at regular intervals. While shown in FIG. 1. is the hook portion 14 having a rectangular shape, the shape of the hook portions 14 is not limited thereto as long as the shape defines a shape such that a hook piece exists. Examples of the shape include a triangular shape and a fan shape, and the shape of the hook portions 14 can be varied appropriately.

The split sleeve 1 having the above-described configuration can produce the following effect. As described above, including the hook portions 14 protruding in the diameter direction of the tube-shaped portion 10 into which the ferrule is to be inserted, the split sleeve 1 of the present embodiment can be limited in its movement toward the front only by being housed in the connector housing while the hook portions 14 are hooked on the connector housing. Thus, it is unnecessary to provide the connector housing with a front stopping portion arranged to stop the split sleeve 1, which can accordingly reduce the size of the entire optical connector 2 in which the split sleeve 1 is to be housed.

In addition, because the split sleeve 1 further includes the straight portions 12 that extend from the one end of the tube-shaped portion 10 in the axial direction of the tube-shaped portion 10, and the hook portions 14 have the shape of bending in the diameter direction from the top ends of the straight portions 12, that is, because the straight portions 12 exist between the tube-shaped portion 10 and the hook portions 14, the tube-shaped portion 10 can be prevented from decreasing in degree of tube shape by the existence of the straight portions 12 for the following reason. The split sleeve 1 is preferably made from a metal plate subjected to press working. When the hook portions 14 are bent in the diameter direction of the tube-shaped portion 10, the root sides of the hook portions 14 are pulled by the bending of the hook portions 14. In the case of the configuration of including the hook portions 14 disposed directly at the one end of the tube-shaped portion 10 (i.e., with no straight portions 12 existing therebetween), the tube-shaped portion 10 is pulled by the bending of the hook portions 14 to be deformed, which could cause the tube-shaped portion 10 to decrease in degree of tube shape. However, in the present embodiment, because the straight portions 12 exist between the tube-shaped portion 10 and the hook portions 14, the tube-shaped portion 10 can be prevented from being deformed significantly while the straight portions 12 could be deformed slightly by the bending of the hook portions 14. Thus, including the straight portions 12 allows the tube-shaped portion 10 to maintain high degree of tube shape, so that axis deviation of ferrules (optical fibers 92) to be inserted into the tube-shaped portion 10 can be prevented.

In addition, including the plurality of hook portions 14 disposed at regular intervals, the split sleeve 1 of the present embodiment can be prevented from being inclined in the connector housing, that is, the split sleeve 1 can be housed steady in the connector housing.

Next, a description of the optical connector 2 of a preferred embodiment of the present invention will be provided. The optical connector 2 includes the split sleeves 1, a ferrule assembly 20 arranged to hold the optical fibers 92, and the connector housing arranged to house the split sleeves 1 and the ferrule assembly 20.

The ferrule assembly 20 includes ferrule bodies 201 and a ferrule holder 202. Each ferrule body 201 is arranged to hold the top end of each optical fiber 92. In the present embodiment, the optical cable 90 includes two optical fibers 92, so that the ferrule assembly 20 includes two ferrule bodies 201. The ferrule bodies 201 are fixed to the ferrule holder 202. To be specific, the ferrule bodies 201 are pressed into fixing holes 202a for ferrule bodies that are provided on the top end face of the ferrule holder 202. In addition, the ferrule holder 202 includes a glue inlet 202b on its upper face. The optical fibers 92 are fixed to the ferrule bodies 201 (the ferrule assembly 20) by pouring a glue into the glue inlet 202b while the optical fibers 92 are inserted into the ferrule bodies 201 fixed to the ferrule holder 202. That is, using the ferrule holder 202 allows the plurality of optical fibers 92 to be fixed to the ferrule bodies 201 at a time.

The connector housing includes a first housing member 22, and a second housing member 24 that is put on the first housing member 22.

The first housing member 22 includes a sleeve accommodating portion 221 arranged to accommodate the ferrule bodies 201 of the ferrule assembly 20 and the split sleeves 1, a ferrule-holder accommodating portion 222 arranged to accommodate the ferrule holder 202 of the ferrule assembly 20, and a cable fixing portion 223 to which the optical cable 90 is to be fixed. In addition, the first housing member 22 includes four attachment holes 224 on its lateral sides.

The sleeve accommodating portion 221 defines a portion having a tube shape that protrudes toward the top end side of the connector. The ferrule bodies 201 and the split sleeves 1 are accommodated inside of the sleeve accommodating portion 221. To be specific, the tube-shaped portions 10 of the split sleeves 1 are accommodated inside of the sleeve accommodating portion 221, and the hook portions 14 of the split sleeves 1 are hooked on the rim (outer edge) of an opening of the sleeve accommodating portion 221, the opening being on the posterior end side of the sleeve accommodating portion 221. Thus, the split sleeves 1 do not move toward the front because of the hook portions 14 hooked on the rim of the opening of the sleeve accommodating portion 221. Meanwhile, the ferrule bodies 201 are inserted into the split sleeves 1.

Figure 2:
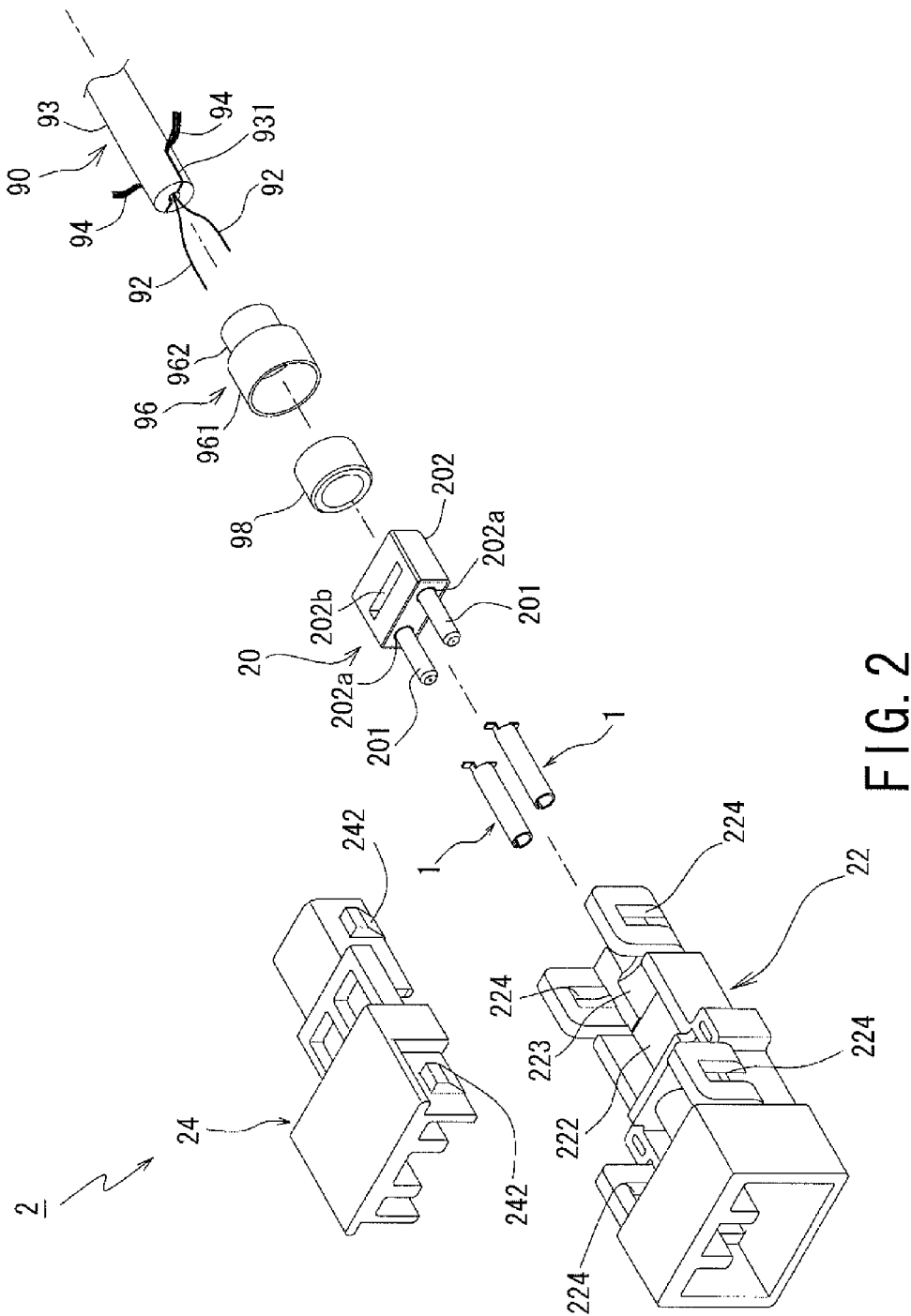
FIG. 2 is an exploded perspective view showing an optical connector of a preferred embodiment of the present invention (also showing an optical cable and a cable fixing member).
Figure 3:
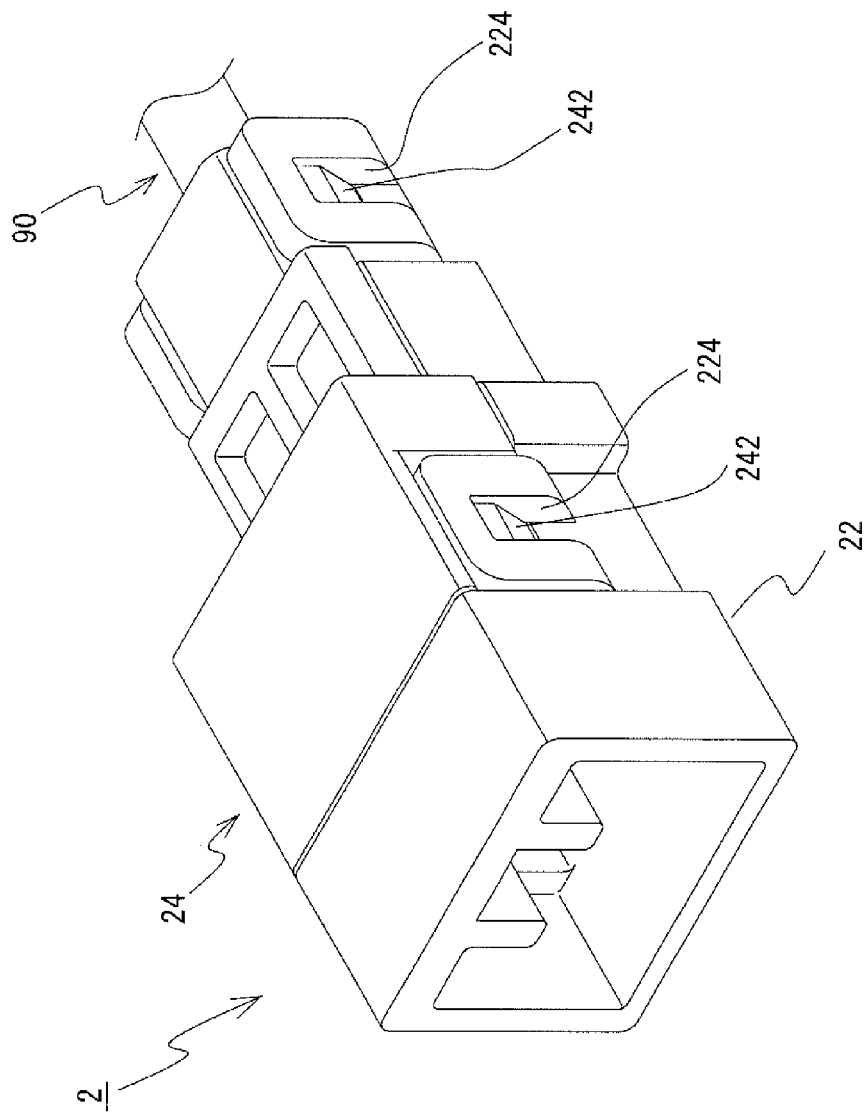
FIG. 3 is an external perspective view showing the optical connector of the preferred embodiment of the present invention (also showing the optical cable).

The ferrule-holder accommodating portion 222 defines a dent having a rectangular shape when seen in a plan view so as to accommodate the ferrule holder 202, which is disposed on the posterior end side of the sleeve accommodating portion 221. The ferrule-holder accommodating portion 222 is provided to the first housing member 22 while being open outward (upward) as shown in FIG. 2.

The cable fixing portion 223 defines a dent to which the end of the optical cable 90 is to be fixed. To be specific, a cable fixing member that is fixed to an end portion of the optical cable 90 is to be fixed to the cable fixing portion 223.

The cable fixing member is fixed to an end portion of a sheath 93 of the optical cable 90 as follows. The cable fixing member includes a crimp ring 96 and a stop ring 98. The crimp ring 96 defines a member having a stepwise tube shape that is preferably made from aluminum. The crimp ring 96 includes a grip portion 961 for gripping reinforcement wires, which has a relatively large diameter, and a grip portion 962 for gripping a sheath, which has a relatively small diameter. The stop ring 98 defines a member having a tube shape that is preferably made from stainless steel or brass. The sheath 93 of the optical cable 90 includes a slit (incision) 931 having a given length from its top end side. Reinforcement wires 94 are drawn from the slit 931 to the outside of the sheath 93. The crimp ring 96 is fixed to the outside of the sheath 93 by the grip portion 962. A protrusion arranged to dig into the sheath 93 is provided to the inside of the grip portion 962. The stop ring 98 is fixed to the inside of the grip portion 961 of the crimp ring 96 while fixed to the outside of the top end (i.e., the portion where the slit 931 is provided) of the sheath 93. Thus, the reinforcement wires 94 of the optical cable 90 are sandwiched between the inner periphery of the grip portion 961 of the crimp ring 96 that is fixed to the sheath 93 and the outer periphery of the stop ring 98. In addition, the optical fibers 92 are put through the stop ring 98. Thus, the cable fixing member is fixed to the optical cable 90 while the reinforcement wires 94 are being caught in the cable fixing member.

The cable fixing portion 223 defines a stepwise dent having a round shape in cross section. To be specific, the cable fixing portion 223 includes a relatively large-diameter dent having a round shape in cross section that is disposed on the top end side of the housing, and a relatively small-diameter dent having a round shape in cross section that is disposed on the posterior end side of the housing, where the dents are aligned in the axial direction. The grip portion 961 of the crimp ring 96 is housed in the relatively large-diameter dent of the cable fixing portion 223, while the grip portion 962 of the crimp ring 96 is housed in the relatively small-diameter dent of the cable fixing portion 223.

The second housing member 24 is put on the first housing member 22 on the posterior end side of a hood portion of the first housing member 22. The second housing member 24 includes a cable fixing portion 223 on its posterior end side, which has a shape same as that of the cable fixing portion 223 of the first housing member 22 (i.e., the shape of including a relatively large-diameter dent having a round shape in cross section that is disposed on the top end side of the housing, and a relatively small-diameter dent having a round shape in cross section that is disposed on the posterior end side of the housing, where the dents are aligned in the axial direction so as to be of a monolithic construction). In addition, the second housing member 24 includes four attachment protrusions on its lateral sides. The attachment protrusions are engaged in the attachment holes 224 of the first housing member 22, whereby the second housing member 24 is put on the first housing member 22. Thus, the opening of the sleeve accommodating portion 221, the opening of the ferrule-holder accommodating portion 222, and the opening of the cable fixing portion 223 of the first housing member 22 are covered by the second housing member 24. In this manner, the ferrule bodies 201, the ferrule holder 202, and the cable fixing member are housed in the connector housing. In the cable fixing member, the grip portion 961, which is larger in diameter than the grip portion 962, is caught in steps of the cable fixing portions 223 of the first housing member 22 and the second housing member 24 on the top end side of the grip portion 962. Having this configuration, the cable fixing member does not fall off the optical connector 2 even when the optical cable 90 is pulled.

The optical connector 2 having the above-described configuration can produce the following effect. Because the optical connector 2 of the present embodiment has the configuration that the hook portions 14 of the split sleeves 1 are hooked on the rim of the opening of the sleeve accommodating portion 221, the opening being on the posterior end side of the sleeve accommodating portion 221, the split sleeves 1 can be limited in their movement toward the front. Thus, it is unnecessary to provide the connector housing with a front stopping portion arranged to stop the split sleeves 1, which can accordingly reduce the size of the entire optical connector 2.

In addition, the effect that the tube-shaped portions 10 can maintain high degree of tube shape by including the straight portions 12, and the effect that the split sleeves 1 can be prevented from being inclined in the connector housing because the two or more hook portions 14 are disposed at regular intervals can be produced, which are the same effects produced by the split sleeve 1 of the above-described embodiment.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

For example, while described in the above-described embodiments is the "split" sleeve 1 (the split sleeves 1 of the optical connector 2) that includes the slit 101 in the axial direction, the present invention is not limited to the present configuration. A sleeve including no slit can be used in the present invention.

The invention claimed is:

1. An optical connector, comprising:
    a sleeve comprising:
        a portion having a tube shape;
        a straight portion that extends from one end of the tube-shaped portion in an axial direction of the tube-shaped portion; and
        a hook portion protruding in a diameter direction of the tube-shaped portion, the hook portion having a bending shape in the diameter direction from an end of the straight portion;
    a ferrule disposed within the sleeve; and
    an optical fiber disposed within the ferrule.

2. The optical connector according to claim 1, wherein the hook portion comprises two or more hook portions that are disposed at regular intervals.

3. The optical connector according to claim 2, further comprising:
    a connector housing, in which the sleeve is housed, and which comprises a sleeve accommodating portion,
    wherein the tube-shaped portion of the sleeve is housed in the sleeve accommodating portion, and
    wherein the hook portions are hooked on a rim of an opening of the sleeve accommodating portion, the opening being on a posterior end side of the sleeve accommodating portion.

4. The optical connector according to claim 1, further comprising:
    a connector housing, in which the sleeve is housed, and which comprises a sleeve accommodating portion,
    wherein the tube-shaped portion of the sleeve is housed in the sleeve accommodating portion, and
    wherein the hook portion is hooked on a rim of an opening of the sleeve accommodating portion, the opening being on a posterior end side of the sleeve accommodating portion.

* * * * *